J. RITTCHEN.
CONVERTIBLE VEHICLE.
APPLICATION FILED AUG. 8, 1914.
1,163,460.
Patented Dec. 7, 1915.
2 SHEETS—SHEET 1.
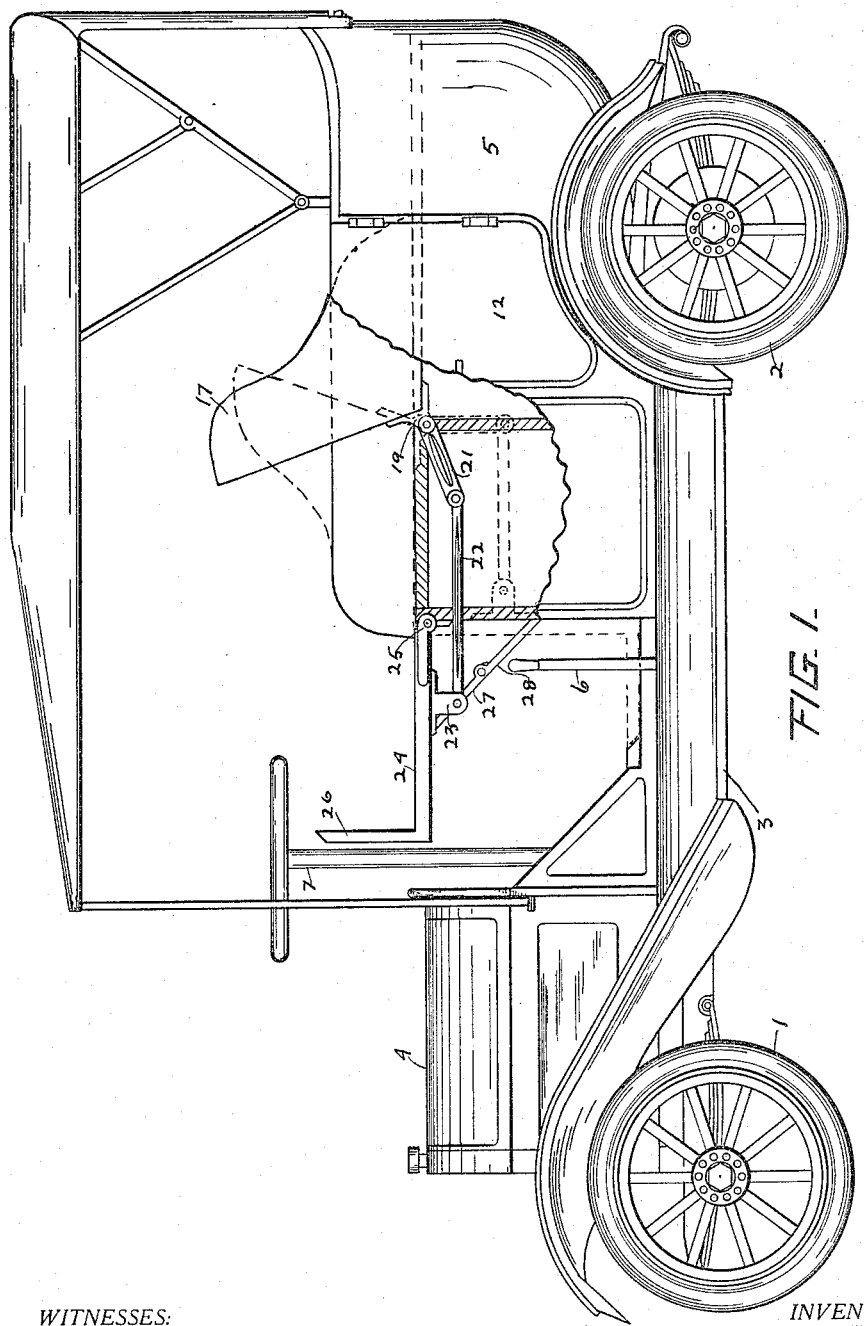
WITNESSES:
E. A. Gardner
A. H. Kephart
INVENTOR.
J. RITTCHEN.
BY Carlos P. Griffin
ATTORNEY.

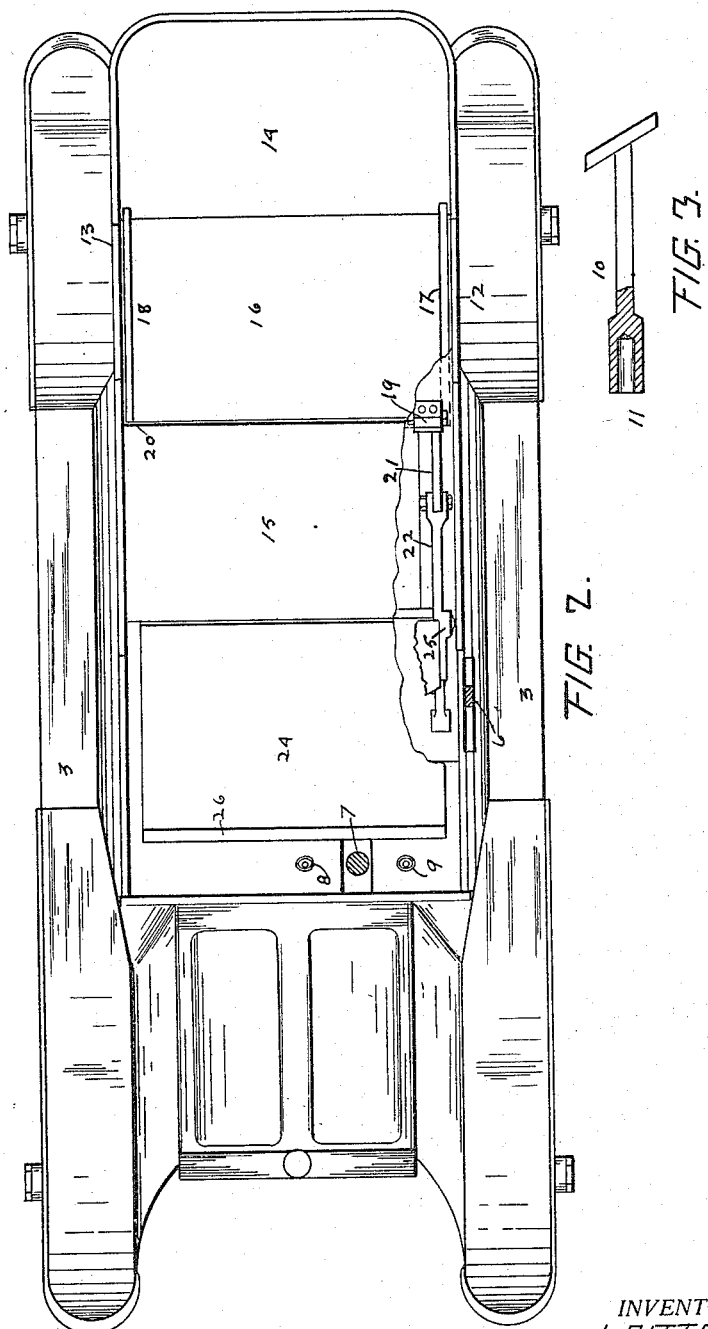

UNITED STATES PATENT OFFICE.

JOSEF RITTCHEN, OF SAN FRANCISCO, CALIFORNIA.

CONVERTIBLE VEHICLE.

1,163,460.  Specification of Letters Patent.  Patented Dec. 7, 1915.

Application filed August 8, 1914. Serial No. 855,831.

*To all whom it may concern:*

Be it known that I, JOSEF RITTCHEN, a subject of the Emperor of Austria-Hungary, residing at San Francisco, in the county of San Francisco, State of California, have invented a new and useful Convertible Vehicle, of which the following is a specification in such full and clear terms as will enable those skilled in the art to construct and use the same.

This invention relates to an automobile and its object is to provide an automobile with means whereby it may be used to sleep in at night, the seats being converted into a bed.

An embodiment of the invention is shown in the drawing in which the same reference numeral is applied to the same portion throughout, but I am aware that there are many modifications thereof.

Figure 1 is a side elevation of an automobile with certain parts thereof broken away to show this invention applied thereto, Fig. 2 is a plan view of the automobile with certain parts broken away to show the operating mechanism of the invention, and Fig. 3 is a side elevation partly in section of one of the removable foot pedals used for operating the machine.

The numeral 1 represents the front wheels of the machine, 2 the rear wheel, 3 the running board, 4 the hood over the engine and 5 the body of the machine.

It will be understood that the frame and structural parts of the machine may be built in any well known manner, the automobile being controlled by means of a lever 6, movable steering post 7 and rods 8 and 9, on which rods the removable foot pedals 10 may be placed, said foot pedals having a socket 11 which fits over the rods 8 and 9 and enables the driver to operate the clutch and brake in a well known manner.

The body of the machine has two doors 12 and 13 for entrance into and exit from the tonneau of the machine when used in its normal manner. The back seat is indicated at 14 and the front seat at 15. Hinged on the back of the front seat is a back 16, which back has side pieces 17 and 18 connected therewith to afford the means for properly supporting the upholstery of the machine, which upholstery forms no part of the present invention and is not illustrated herein. The back is hinged to the back of the front seat at 19 and 20, said hinges each having an arm 21 rigidly connected therewith, which arms are connected to the rods 22 extending to the brackets 23 on the front board 24 hinged at 25 to the front of the front seat. The front board 24 is provided with a foot board 26. The front board 24 has two pairs of buggy braces 27 and 28 connected therewith and to the side of the front seat, thereby enabling the front board to be locked in the position shown in Fig. 1 when it is desired to use the machine as a bed.

In operation the back of the back seat is tipped down into line with the front seat and rear seat, while at the same time the levers 21 push the rods 22 and front board 24 up to the level of the front seat, the operating pedals and steering post being removed or pushed down out of the way to permit the board 26 to move upwardly.

An advantage of this construction lies in the fact that the board 26 is very easily removed from its position as foot board for the inspection or oiling of the parts of the machine below the frame, while at the same time it affords a means for holding the bedding in place in the machine when it is to be used as a bed.

Having thus described my invention what I claim as new and desire to secure by Letters Patent of the United States, is as follows, modifications within the scope of the claims being expressly reserved:

1. A convertible vehicle comprising a vehicle body having a pair of seats therein, a back hinged to one of said seats and adapted to fill the space when turned downwardly between that seat and the other seat, a board hinged to the front of the front seat and adapted to be turned up into the plane of the seats and the back and a foot board connected with the previously mentioned board which forms the floor in front of the front seat when the bed is not in use and which forms a foot board at the foot of the bed when turned up.

2. A convertible vehicle comprising a vehicle body, a pair of seats therefor, a back, having arm pieces, hinged to one of said seats and adapted when turned to fill the space between the two seats substantially in the same horizontal plane thereof, a front board hinged to the front of the front seat, means connected with the hinged back to raise the front board when the back is lowered and a foot board connected to the front board and forming the floor of the vehicle in front of the front seat when the bed is not in use.

3. A convertible vehicle comprising a vehicle body having a pair of seats, a back hinged to one of said seats and having arm pieces on the sides thereof and adapted to fill the space between the two seats in substantially the same horizontal plane, a front board carrying a foot board forming the floor of the vehicle in front of the front seat and hinged to the front of the front seat, means connected to the back for raising the front board and foot board when the back is lowered, and means to hold the front board in the raised position when the back is lowered.

In testimony whereof I have hereunto set my hand this 1st day of August A. D. 1914, in the presence of the two subscribed witnesses.

JOSEF RITTCHEN.

Witnesses:
C. P. GRIFFIN,
HENRY B. LISTER.

Copies of this patent may be obtained for five cents each, by addressing the "Commissioner of Patents, Washington, D. C."